May 14, 1935.  P. SIDNEY  2,001,401
FASTENING DEVICE
Filed Sept. 16, 1932
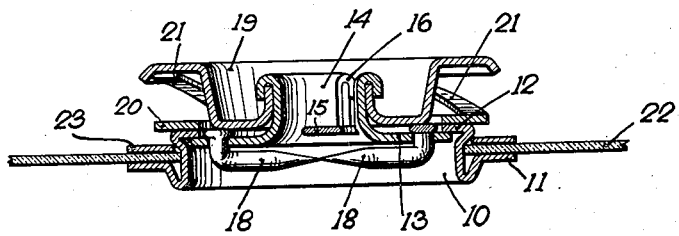
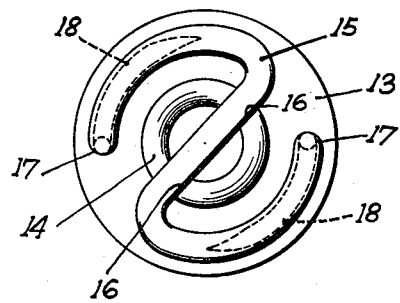
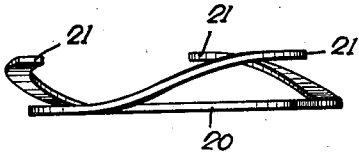
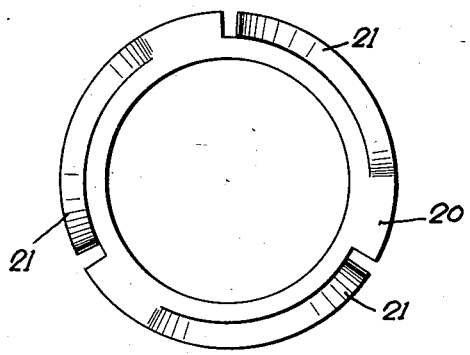
INVENTOR.
PHILIP SIDNEY,
BY Duell, Dunn & Anderson
ATTORNEYS.

Patented May 14, 1935

2,001,401

UNITED STATES PATENT OFFICE 2,001,401

FASTENING DEVICE

Philip Sidney, Jersey City, N. J.

Application September 16, 1932, Serial No. 633,411

4 Claims. (Cl. 24—112)

This invention relates to a new and improved fastening device of the type adapted to secure several thicknesses of material to each other.

It is an object of the invention to provide a structure of this nature which will function readily with little effort on the part of the operator and at the same time be positive in its engagement of the material to be held.

Another object is that of providing a device which will be inconspicuous in its application to wearing apparel or the like and in such application will not injure the user.

A still further object is that of providing a device which is simple and rugged in construction and which will operate over long periods of time with freedom from mechanical difficulty.

With these and other objects in mind, reference is had to the attached sheet of drawings illustrating one embodiment of the invention and in which:

Fig. 1 is a cross-sectional view of the device as secured to a piece of material;

Fig. 2 is a plan view of a portion of the fastener showing the pin member in position;

Fig. 3 is a plan view of one form of spring member which may be employed in connection with the device; and Fig. 4 is a side elevation of this spring member.

Referring now to the drawing and particularly to Figs. 1 and 2, the fastener comprises a body portion 10, formed with a lower, outwardly extending ring or flange member 11. Positioned directly under the upper flange 12 and held in position thereby is a plate 13 which is formed with a rolled collar portion 14 in its center. An S shaped pin member 15 is keyed into slots 16 in this collar portion and the ends of the pin go through openings 17 in the plate 13. Below the surface of the plate the pin is bent at right angles and terminates in points 18.

At the top of the device and held in position by the collar portion of the plate is a manipulating member 19. This member serves to hold the pin in position on the plate and when rotated, carries with it both the plate and pin member. Resting on the upper flange of the fastener body is a washer 20 formed with a plurality of spring arms 21. These arms bear against the undersurface of the manipulating member which in turn holds the plate snugly in place against the undersurface of the upper flange of the fastener body. The entire device may be fastened to a piece of material 22 by means of an additional ring or washer 23, which in turn engages an outwardly turned portion of the upper flange of the fastener body.

In operation the manipulating member is depressed by the thumb or fingers of the user causing the plate and the pin member, carried thereby, to be projected downwardly within the interior of the fastener body to a point where it comes in contact with an additional layer of material, not shown, to which it is to be attached. When the pins are in contact with this second layer of material, the manipulating member and with it, the plate and pin member, are rotated in a clockwise direction, causing the lower ends of the pin member to embed themselves in the second layer of material. After this is done, the pressure is released from the manipulating member, allowing the resiliency imparted to it by the springs to cause it to rise, carrying with it the pin member which retracts within the body of the fastener with the material in which it is embedded. The springs additionally hold the pins against rotation and prevent the device from becoming unfastened during use.

It is obvious that other means might be substituted for those shown to impart resiliency to the manipulating member and thus cause the pins to be retracted within the fastener body. Likewise, the number and arrangement of pin points might be varied to suit the particular needs. In certain instances it might also be desirable to eliminate the retractable feature of the device. In that case, the manipulating member would simply be rotated in order to cause the pin ends which would project below the bottom surface of the fastener to embed themselves in the material to be secured. It is also apparent that numerous other changes in construction and rearrangements of the parts might be resorted to without departing from the spirit of the invention as defined by the claims.

Having described my invention, what I claim as new and desire to secure by Letters Patent is:

1. A fastening device comprising a hollow body member formed with an outwardly extending shoulder portion at the upper end thereof, a ring encircling said body member and resting against said shoulder portion, a further outwardly extending flange formed at the lower end of said body member and spaced from said ring whereby a thickness of material may be secured therebetween in relatively immovable position with respect to said fastening device, a pin normally positioned within said hollow body member, a manipulating member fastened to said pin and rotatably and slidably secured to the body member whereby both the manipulating and pin members may be projected and retracted with respect to said body member, and a spring positioned between said body member and said manipulating member for holding the latter in retracting position whereby said pin member is housed within the body member.

2. A fastening device comprising a hollow body member formed with an interior upper flange portion, a manipulating member for association therewith and formed with an outwardly extending plate at the lower edge thereof and normally underlying and engaging the inner surface of said upper flange portion of said body member and being limited in its upward movement thereby, an outwardly disposed flange positioned at the top of said manipulating member and resilient means engaging said last named flange and the flange on said body member to maintain the parts in spaced relationship, and a pin member secured to said manipulating member and normally housed within said hollow body member, said manipulating member being rotatably and slidably secured to said body member for projection and retraction with respect thereto whereby said pin member is unsheathed and sheathed respectively.

3. A fastening device comprising a hollow body member formed with an inwardly extending upper flange, a manipulating member rotatably and slidably secured to said body member for projection and retraction with respect thereto, said manipulating member being formed with an upper flange portion normally spaced from said body member and being additionally provided with a plate normally underlying and engaging the inner surface of the upper flange of said body member to limit the upward movement of said manipulating member, and a pin member fastened to said manipulating member and normally positioned within said hollow body member but being capable of projection beyond said body member when said upper flange portion of said manipulating member is advanced into contact with said body member.

4. A fastening device comprising a hollow body member formed with an inwardly extending upper flange, a manipulating member rotatably and slidably secured to said body member for projection and retraction with respect thereto, said manipulating member being formed with an upper flange portion normally spaced from said body member and being additionally provided with a plate normally underlying and engaging the inner surface of the upper flange of said body member to limit the upward movement of said manipulating member, a pin member fastened to said manipulating member and normally positioned within said hollow body member but being capable of projection beyond said body member when said upper flange portion of said manipulating member is advanced into contact with said body member, and a spring positioned between said upper flange portion of said body member and said upper flange portion of said manipulating member to return the latter to its spaced position from said body member.

PHILIP SIDNEY.